June 22, 1943.  E. L. OLIVER  2,322,586
FILTER
Filed Feb. 24, 1942
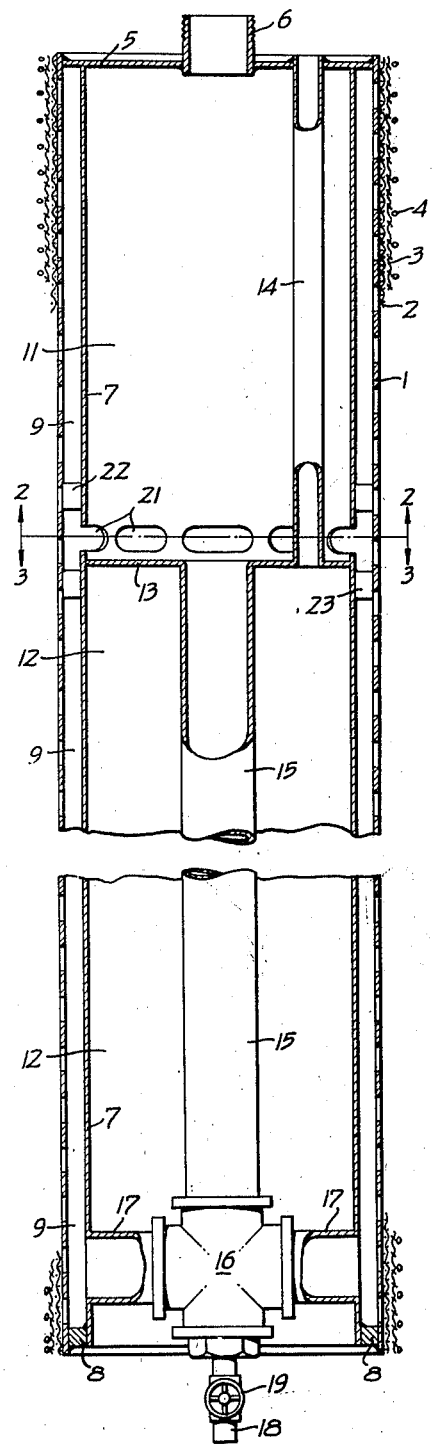
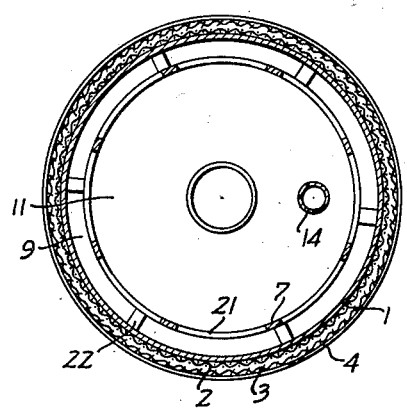
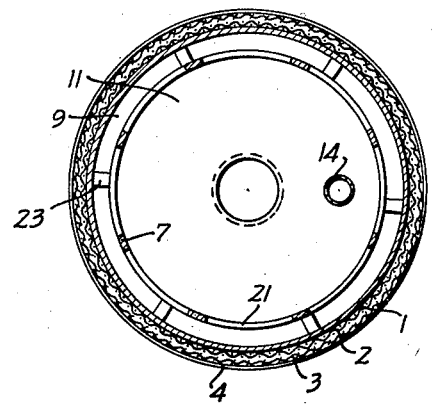
INVENTOR
EDWIN LETTS OLIVER
BY
ATTORNEY Patented June 22, 1943

2,322,586

UNITED STATES PATENT OFFICE 2,322,586

FILTER

Edwin Letts Oliver, Piedmont, Calif., assignor to Oliver United Filters Incorporated, Oakland, Calif., a corporation of Nevada Application February 24, 1942, Serial No. 432,120

1 Claim. (Cl. 210—154)

This invention relates in general to filters and more particularly to filters of the tube thickener type.

Tube thickeners in general consist of a tank for the accommodation of the material to be filtered. Depending into this tank are one or more perforate tubes having their lower ends closed and provided on their peripheries with a suitable filter medium. The upper ends of these tubes communicate through suitable conduits with an automatic valve by means of which the interior of the tube may be successively subjected to subatmospheric pressure and to superatmospheric pressure. Upon the application of subatmospheric pressure to the interior of the tube, liquid from the material being filtered passes through the filter medium to the interior of the tube and then outwardly through the automatic valve. At the same time, a cake of solids tends to build up on the surface of the filter medium. Upon the application of a reverse pressure, the cake deposited on the filter medium is blown outwardly therefrom, the cycle of operation then being repeated. Ordinarily air is used as the working medium for effecting a reverse pressure for discharging the tubes.

Two problems arise in connection with a tube of this character. In the first place, to effect a uniform discharge of the cake formed on the filter medium, it is essential that the air used as a working medium for effecting the reverse pressure be kept from gaining access to the walls of the tube, for if this should occur the air would simply pass out through that portion of the tube, leaving the remaining portion of the tube undischarged. In the second place, it is oftentimes desirable to remove one of the tubes for repairs while the thickener is in operation. In reconnecting such a tube after the repairs have been made, it must be submerged in the material contained in the thickener tank, and since the tube is filled with air, it is relatively buoyant and consequently considerable difficulty is experienced in maintaining the tube submerged with its upper end in strict alignment with its connection to the automatic valve.

In my application Serial No. 343,571 filed July 2, 1940, and of which the present application is a continuation in part, I have disclosed a thickener tube having a relatively small internal capacity, so constructed that its entire filtering surface can be discharged without the escape of air through any portion thereof. In the tube illustrated in my prior application, this result is obtained by the use of a pair of vertically spaced sleeves disposed within the thickener tube.

The object of this invention is the provision of a thickener tube having a small internal capacity and which can be completely discharged without the escape of air through its filtering surface and in which these results are accomplished by the use of a single sleeve disposed within the thickener tube rather than by the use of a pair of vertically spaced sleeves.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claim may be embodied in a plurality of forms.

Referring to the drawing:

Figure 1 is a vertical mid-section taken through a thickener tube embodying the objects of my invention.

Figure 2 is a section taken on the line 2—2 of Figure 1.

Figure 3 is a section taken on the line 3—3 of Figure 1.

As shown in these figures, the objects of my invention have been embodied in a thickener tube comprising a sheet metal perforate shell 1 which preferably is slightly tapered from top to bottom. Disposed over the shell 1 is a layer 2 of wire mesh screen, and disposed over this screen is a layer 3 of filter medium. The filter medium is held in place against the screen or directly against the shell 1 if no screen is used, by means of a spiral wire winding 4 which also serves to form weakened lines in the cake deposited on the filter medium so that the cake may be more readily discharged.

Welded over the upper end of the shell 1 is a plate 5 to which is secured a threaded pipe fitting 6. By means of this pipe fitting the thickener tube may be connected with the automatic valve usually used in conjunction with equipment of this general type. Depending from the plate 5 and welded thereto, is an inner imperforate tube or sleeve 7 having its lower end sealed to the lower end of the shell 1 by an annular ring 8, the ring 8 being welded to both the sleeve 7 and the shell 1. The shell 1, sleeve 7, plate 5, and ring 8 define a filtrate compartment 9.

The sleeve 7 is divided into upper and lower compartments 11 and 12 by a plate 13 welded to the sleeve 7 intermediate its ends. Extending between the plates 5 and 13 and welded thereto is a vent pipe 14 serving to establish communication between the lower compartment 12 and a zone immediately above the plate 5. Welded to the plate 13 is a pipe 15 extending downwardly through the compartment 12 and terminating in a T 16 communicating through arms 17 with the lower end of the filtrate compartment 9. Depending from the T 16 is a drain pipe 18 provided with a hand valve 19.

For the purpose of establishing communication between the filtrate compartment 9 and the upper compartment 11, the shell 7 is formed immediately above the plate 13 with a series of annularly disposed slots 21.

The shell 1 and sleeve 7 can be maintained in spaced relation intermediate their ends by one or two sets of peripherally spaced spacing members 22 and 23.

When in operation, a tube of this character is surrounded by the pulp or slurry to be thickened, the pulp or slurry being free to pass upwardly through the lower compartment 12 and to thereby displace and force any air entrapped therein through the vent pipe 14. On the application of vacuum to the tube through the pipe fitting 6, the liquid content of the pulp passes through the shell 1 into the annular filtrate compartment 9. The filtrate passing through the lower portion of the shell is drawn through the T 16 and the pipe 15 into the upper compartment 11, where it joins the filtrate drawn therein through the upper portion of the shell 1 and through the slots 21. The filtrate drawn into the upper compartment 11 from both sources passes upwardly through the pipe fitting 6. During this so-called pick-up period of the cycle of operation, a layer of solids is formed on the filter medium.

The discharge of the cake formed on the filter medium is effected by forcing air or other working medium downwardly through the pipe fitting 6 onto the surface of the filtrate disposed within the upper compartment 11. The air pressure is transmitted to the filtrate, which in turn applies a uniform back pressure to every portion of the cake deposited on the filter medium. In this connection it is to be observed that the back pressure is transmitted to the cake by filtrate passing outwardly through the slots 21 as well as by filtrate passing outwardly through the T 16.

Although the fundamental operation of the tube above disclosed is the same as the operation of the tube disclosed in my prior filed application above referred to, the desired results have been accomplished by the use of a single inner sleeve rather than with a pair of spaced sleeves as shown in the earlier modification.

I claim:

A thickener tube comprising: a perforate shell; a closure plate secured to and over the upper end of said shell and formed with a fluid outlet; an imperforate sleeve of smaller diameter than said shell concentrically disposed within said shell and secured to said closure plate, said shell and sleeve together defining an annular filtrate compartment; a closure member secured to the lower ends of said shell and sleeve for closing the lower end of said filtrate compartment; a partition member secured to said sleeve intermediate its ends for dividing said sleeve into upper and lower compartments, said sleeve being formed with a plurality of ports above said partition member; a vent pipe extending between said closure plate and said partition and communicating with said lower compartment and a zone immediately above said closure member; and a conduit depending from said partition member into said lower compartment and communicating with said upper compartment and the lower end of said filtrate compartment.

EDWIN LETTS OLIVER.